(12) United States Patent
Salter et al.

(10) Patent No.: US 11,433,752 B2
(45) Date of Patent: Sep. 6, 2022

(54) LIQUID DIVERTER ASSEMBLY AND LIQUID DIVERTING METHOD FOR A VEHICLE DOOR

(71) Applicant: Ford Global Technologies, LLC, Dearborn, MI (US)

(72) Inventors: Stuart C. Salter, White Lake, MI (US); Chester Stanislaus Walawender, Livonia, MI (US); Hussein H. Berry, Dearborn, MI (US); Paul Kenneth Dellock, Northville, MI (US); Nizam Khan, Brownstown, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 16/815,705

(22) Filed: Mar. 11, 2020

(65) Prior Publication Data
US 2021/0284003 A1 Sep. 16, 2021

(51) Int. Cl.
*B60J 10/25* (2016.01)
*B60J 5/04* (2006.01)
*B60J 1/17* (2006.01)

(52) U.S. Cl.
CPC ............ *B60J 10/25* (2016.02); *B60J 5/0402* (2013.01); *B60J 5/0418* (2013.01); *B60J 1/17* (2013.01)

(58) Field of Classification Search
CPC . B60J 1/17; B60J 5/0402; B60J 5/0418; B60J 5/0419; B60J 5/0412; B60J 10/25
USPC .............................................. 296/146.5, 154
See application file for complete search history.

(56) References Cited

U.S. PATENT DOCUMENTS

| 5,209,546 A * | 5/1993 | Hasegawa ................ B60J 7/022 296/213 |
| 5,943,823 A * | 8/1999 | Yoshida .................. B60J 5/0402 49/416 |
| 5,953,809 A * | 9/1999 | Kowalski ............... B60J 5/0468 29/521 |
| 6,430,878 B2 | 8/2002 | Terasawa et al. |
| 6,880,292 B2 * | 4/2005 | Okahara ................ E05F 11/382 49/428 |
| 10,087,671 B2 * | 10/2018 | Linden .................... E05B 81/14 |
| 10,155,436 B2 | 12/2018 | Krishnan et al. |
| 2001/0054259 A1 * | 12/2001 | Terasawa ................. B60J 10/25 49/441 |

(Continued)

FOREIGN PATENT DOCUMENTS

| JP | 5493476 | 12/2010 |
| JP | 2018134916 | 8/2018 |
| KR | 20070056563 | 6/2007 |

*Primary Examiner* — Gregory A Blankenship
(74) *Attorney, Agent, or Firm* — Vichit Chea; Carlson, Gaskey & Olds, P.C.

(57) ABSTRACT

A liquid diverter assembly for a vehicle door includes, among other things, a funnel adjacent a vertically lower end portion of a glass run within a vehicle door, and a conduit that communicates liquid from the funnel around an electrically powered component of the vehicle door. A method of diverting liquid within a vehicle door includes, among other things, collecting liquid from a glass run of a vehicle door within a funnel, communicating liquid from the funnel to a conduit, and communicating liquid through the conduit such that the liquid moves around an electric component of the vehicle door.

18 Claims, 4 Drawing Sheets

(56) References Cited

U.S. PATENT DOCUMENTS

| | | | |
|---|---|---|---|
| 2004/0221512 A1* | 11/2004 | Hoffman | B60J 5/0408 49/440 |
| 2007/0084130 A1* | 4/2007 | Gaustad | B60J 5/0405 49/502 |
| 2016/0368356 A1* | 12/2016 | Amagai | B60J 10/86 |
| 2020/0262274 A1* | 8/2020 | McGuire | E05B 79/04 |
| 2020/0307361 A1* | 10/2020 | Kracht | B60J 5/0402 |
| 2021/0284003 A1* | 9/2021 | Salter | B60J 10/25 |
| 2021/0300165 A1* | 9/2021 | Yamada | B60J 10/24 |
| 2022/0056738 A1* | 2/2022 | Philippe | E05B 81/54 |

\* cited by examiner

LIQUID DIVERTER ASSEMBLY AND LIQUID DIVERTING METHOD FOR A VEHICLE DOOR

TECHNICAL FIELD

This disclosure relates generally to diverting liquid and, more particularly, to diverting liquid within a vehicle door around electrically powered components.

BACKGROUND

Some vehicle doors include mechanical latches that can be released by a user actuating a door handle. Other vehicle doors include electrically powered latches and electrically powered door presenters. Liquid, such as water, can freeze within a vehicle door and, among other things, interfere with operation of electrically powered components.

SUMMARY

A liquid diverter assembly for a vehicle door, according to an exemplary aspect of the present disclosure includes, among other things, a funnel adjacent a vertically lower end portion of a glass run within a vehicle door, and a conduit that communicates liquid from the funnel around an electrically powered component of the vehicle door.

In another example of foregoing assembly, the funnel and the glass run are formed together as a single monolithic structure.

In another example of any foregoing assemblies, the conduit is a hose.

Another example of any of the foregoing assemblies includes a bracket. The glass run is secured to a panel of the vehicle door through the bracket.

In another example of any of the foregoing assembles, the glass run and the funnel are made of a polymer-based material.

In another example of any of the foregoing assemblies, the funnel is configured to receive liquid from the glass run.

In another example of any of the foregoing assemblies, the funnel is directly attached to the glass run.

In another example of any of the foregoing assemblies, the liquid is water.

Another example of any of the foregoing assemblies includes a door presenter as the electrically powered component.

Another example of any of the foregoing assemblies includes an electrically powered latch assembly adjacent the vertically lower end portion of the glass run. The funnel is configured to block liquid from splashing on the electrically powered latch assembly.

A method of diverting liquid within a vehicle door according to another exemplary aspect of the present disclosure includes collecting liquid from a glass run of a vehicle door within a funnel, communicating liquid from the funnel to a conduit, and communicating liquid through the conduit such that the liquid moves around an electrically powered component of the vehicle door.

In another example of the foregoing method, the collecting within the funnel is at a position vertically above the electrically powered component.

In another example of any of the foregoing methods, the funnel is adjacent a vertically lower end portion of the glass run.

Another example of any of the foregoing methods includes guiding movement of a vehicle window using the glass run.

In another example of any of the foregoing methods, the glass run and the funnel are formed together as a single, continuous structure.

In another example of any of the foregoing methods, the conduit opens to an outlet that is vertically beneath the electrically powered component.

In another example of any of the foregoing methods, the funnel is directly attached to the glass run.

In another example of any of the foregoing methods, the glass run includes a channel that receives a vehicle window when the vehicle window is lowered within the vehicle door.

In another example of any of the foregoing methods, the collecting of liquid from the glass run includes a collecting of liquid that has passed through the channel.

In another example of any of the foregoing methods, the conduit is a hose.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
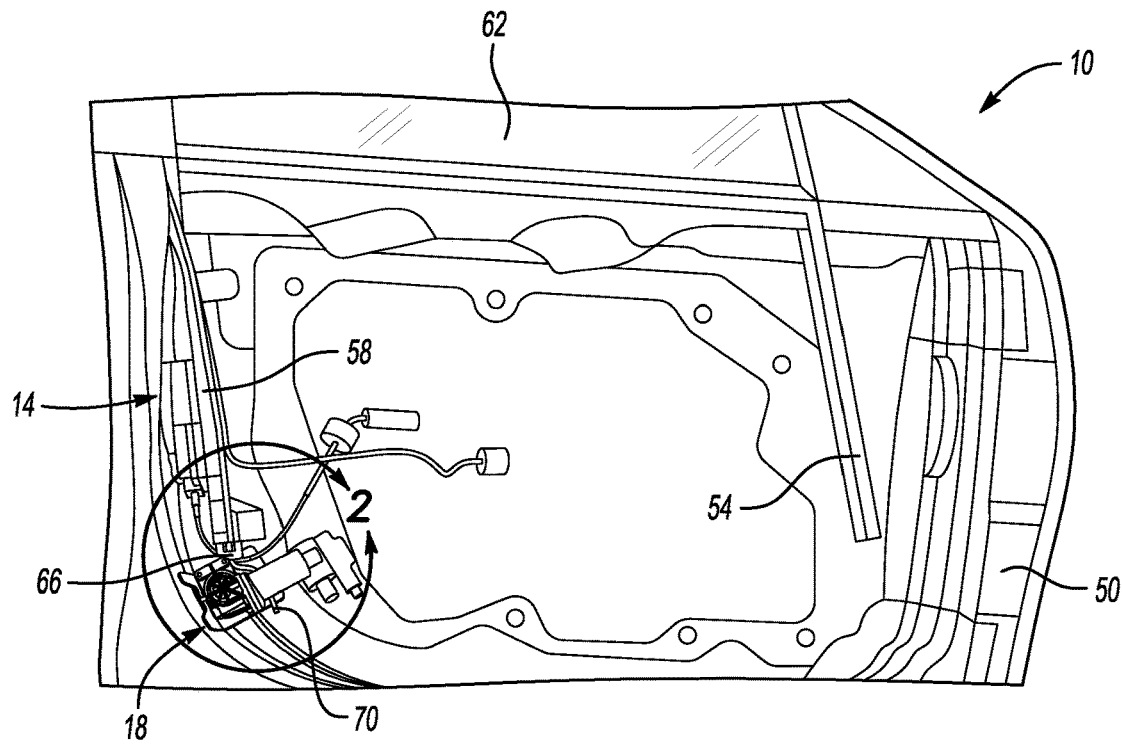
FIG. 1 shows a side view of selected portions of a vehicle door.
Figure 2:
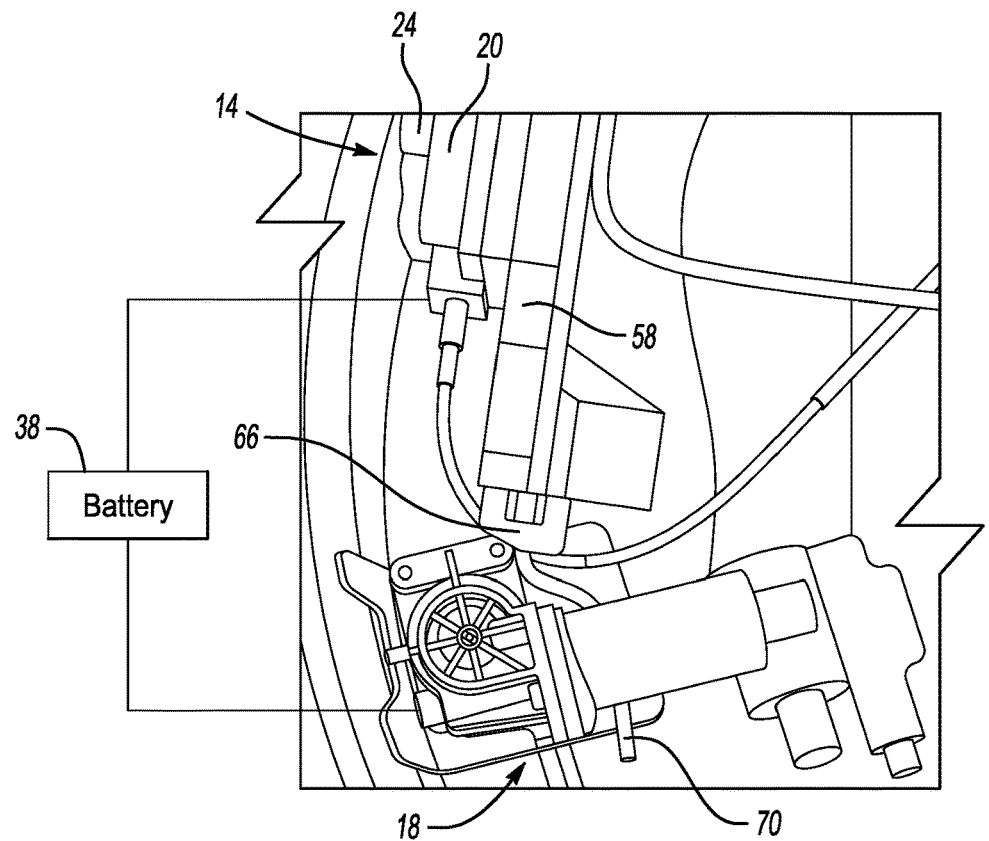
FIG. 2 shows a close-up view of electric door components within the vehicle door according to an exemplary aspect of the present disclosure of FIG. 1.
Figure 3:
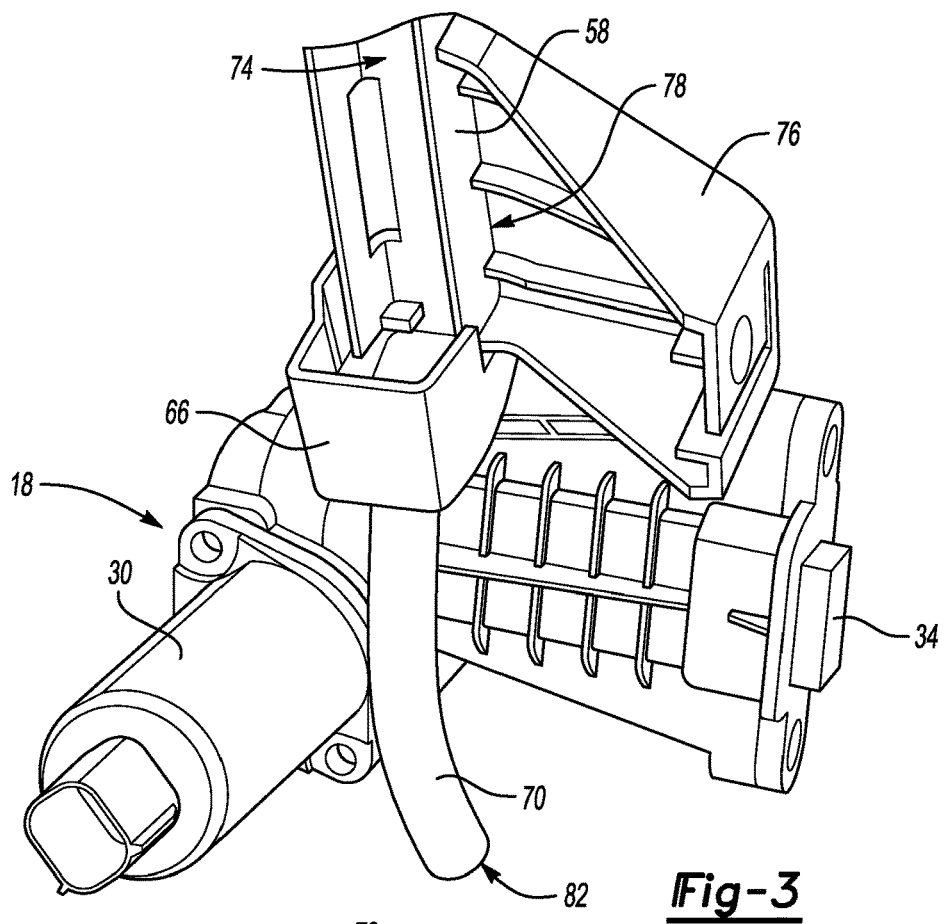
FIG. 3 shows a perspective view of a liquid diverter assembly of the vehicle door along with a door presenter and an aft glass run.
Figure 4:
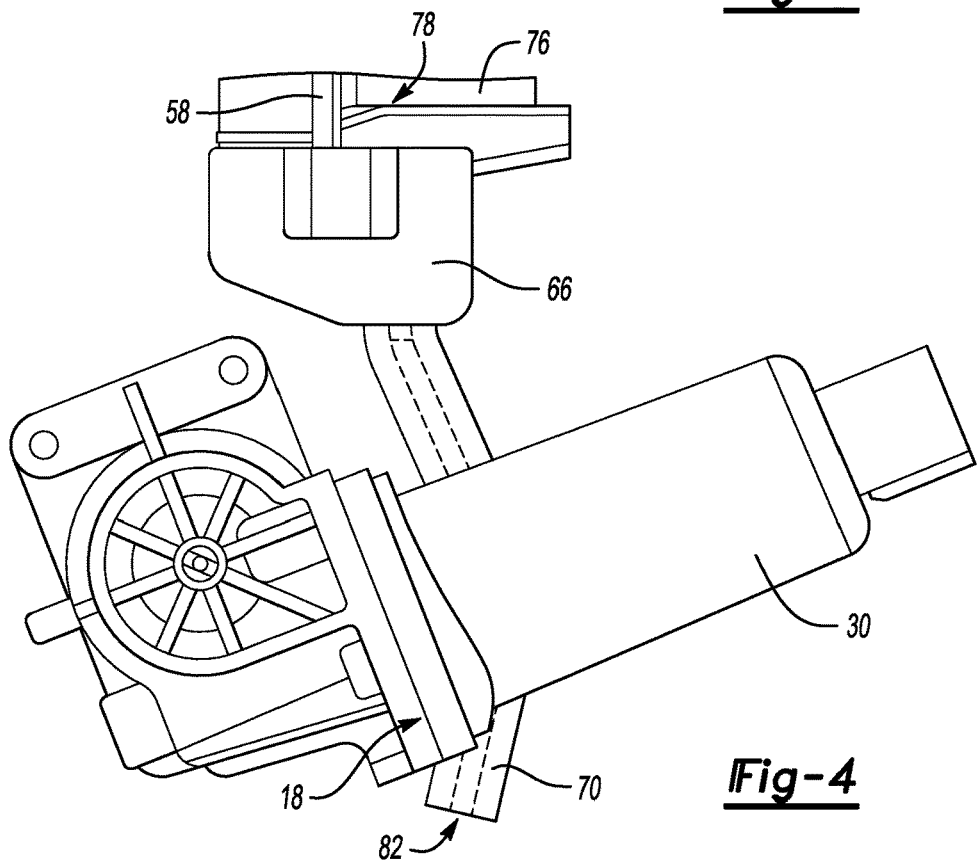
FIG. 4 shows a side view of the components shown in FIG. 3.

This disclosure details an exemplary assembly and method that can direct liquid, such as water, around an electrically powered component of a vehicle door. The electrically powered component can be an electrically powered door presenter or latch assembly.

With reference to FIGS. 1-4, a vehicle door 10, in an exemplary embodiment, can be hingeably secured to a body structure of the vehicle. The vehicle door 10 includes electrically powered components. In this example, the electrically powered components include an electrically powered latch assembly (e-latch) 14 and an electrically powered door presenter assembly 18. Electrically powered components differ from purely mechanical components due to, among other things, the electrically powered components being electrically activated.

The e-latch 14 includes a latch actuator 20 and a pawl 24. The latch actuator 20 can be powered to transition the pawl 24 from a latched position to an unlatched position. The latch actuator 20 can be a motor that is powered to transition the pawl 24 from the unlatched position to the latched position.

In the latched position, the pawl 24 holds the vehicle door 10 in a closed position relative to the body structure of the vehicle. The pawl 24 in the latched position can engage a catch within the body structure. In the unlatched position, the pawl 24 disengages from the catch so that the vehicle door 10 can be moved from the closed position to an open position.

A user can enter or exit a passenger cabin of the vehicle when the vehicle door 10 is in the open position. The user can grasp the vehicle door 10 to move of the vehicle door 10 between the open and closed positions. The pawl 24 is disengaged from the catch to permit the user to move the vehicle door 10 between the open and closed positions.

The door presenter 18 includes a presenter actuator 30 and a plunger 34. When the vehicle door 10 is in the closed position and the pawl 24 of the e-latch 14 is in the disengaged position, the presenter actuator 30 can be powered to extend the plunger 34 against the body structure, which moves the vehicle door 10 away from the body structure. This movement provides clearance between the body structure and the vehicle door 10, which permits the user to grip the vehicle door 10 and complete movement of the vehicle door 10 to a fully open position. The presenter actuator 30 can be a motor.

The e-latch 14 and door presenter 18 can be powered by a battery 38 of the vehicle, such as an accessory battery. An alternator could power these components in another example. The e-latch 14 and door presenter 18 can include circuitry and wiring necessary to control the actions described above.

The e-latch 14 and door presenter 18 may be actuated in response to commands from a control module of the vehicle. The control module may issue the commands in response to a user input. In an example, the user interacts with a button on the vehicle or a keyfob to provide the user input.

In addition to the e-latch 14 and door presenter 18, the vehicle door 10 includes an inner panel 50, a forward glass run 54, an aft glass run 58, a window 62, a funnel 66, and a conduit 70.

The aft glass run 58 is sometimes referred to as a below belt bracket. The aft glass run 58 provides a channel 74 that receives an aft end portion of the window 62. The channel 74 can be lined with a sealing member (not shown). The window 62 moves within the channel 74 as the window 62 is moved between a raised position and a lowered position. The aft glass run 58 can include a bracket portion 76. At least one mechanical fastener can extend through an aperture in the bracket portion and engage the inner panel 50 to secure the aft glass run 58.

The forward glass run 54 provides a channel that receives a forward edge portion of the window 62. The forward glass run 54 and the aft glass run 58 can help to hold the window 62 and can help to guide movement of the window 62 between the raised and lowered positions.

Within the vehicle door 10, the door presenter 18 is disposed vertically beneath a vertically lower end portion 78 of the aft glass run 58. The e-latch 14 is also in close proximity to the vertically lower end portion 78 of the aft glass run 58. Vertical, for purposes of this disclosure, is with reference to ground and an ordinary orientation of the vehicle during operation.

Liquid, such as water from a carwash or a rainstorm, can contact the vehicle door 10. The liquid can flow downward within the vehicle door 10. Some of the liquid may collect and drain downward through the channel 74 of the aft glass run 58. If the vehicle is inclined with its front end elevated, even more liquid may be directed into the channel 74 of the aft glass run 58.

If not rerouted, liquid from the aft glass run 58 and other areas of the vehicle door 10 can flow downward onto the door presenter 18. Liquid from the aft glass run 58 can also splash upward onto the e-latch 14. Liquid within the electrically powered components can be undesirable. Among other things, the liquid can freeze and potentially bind the electrically powered components.

In the exemplary embodiment, the funnel 66 and the conduit 70 provide a liquid diverter assembly for the vehicle door 10. The liquid diverter assembly can facilitate movement of liquid around the electrically powered components to reduce the likelihood of liquid coming into contact with the electrically powered components of the vehicle door 10.

The funnel 66 is directly beneath the vertically lower end portion 78 of the aft glass run 58. The funnel 66 opens vertically upward to a position that is vertically above the door presenter 18. The funnel 66 is positioned such that liquid from the aft glass run 58 drips into the funnel 66 rather than onto the door presenter 18. The funnel 66 is thus configured to receive liquid from the aft glass run 58. The funnel 66 is also positioned such that splashing liquid is blocked from contacting the e-latch 14.

In some examples, one or more side walls of the funnel 66 are formed to include an overflow guide that allows for ice expansion and directs excess water away from the electrically powered components. The overflow guide can be a bumped out area of a side wall.

The liquid that has moved into the funnel 66 flows downward to an outlet of the funnel 66. The conduit 70 is coupled to the outlet. The conduit 70 receives the liquid from the funnel 66. The conduit 70 then communicates the liquid from the funnel 66 around the door presenter 18. The fluid exits the conduit 70 at a conduit outlet 82, which is vertically beneath the door presenter 18. The fluid can flow from the conduit outlet 82 into an area of the vehicle door 10 that is vertically beneath the electrically powered components of the vehicle door 10.

The liquid diverter assembly provided by the funnel 66 and the conduit 70 thus collects liquid from the aft glass run 58, and then communicates that liquid through the conduit 70 such that the liquid moves around the electrically powered components. In so doing, the likelihood of the liquid contacting the electrically powered components is reduced.

In the exemplary embodiment, the funnel 66 and the aft glass run 58 are formed together as a single, monolithic structure. The funnel 66 and the aft glass run 58 can be a polymer-based material that is injection molded to provide the combined funnel 66 and aft glass run 58. In a specific example, the polymer-based material is a hard plastic, such as nylon 6. Forming the funnel 66 with the aft glass run 58 can, among other things, reduce overall part complexity and simplify assembly.

Figure 5:
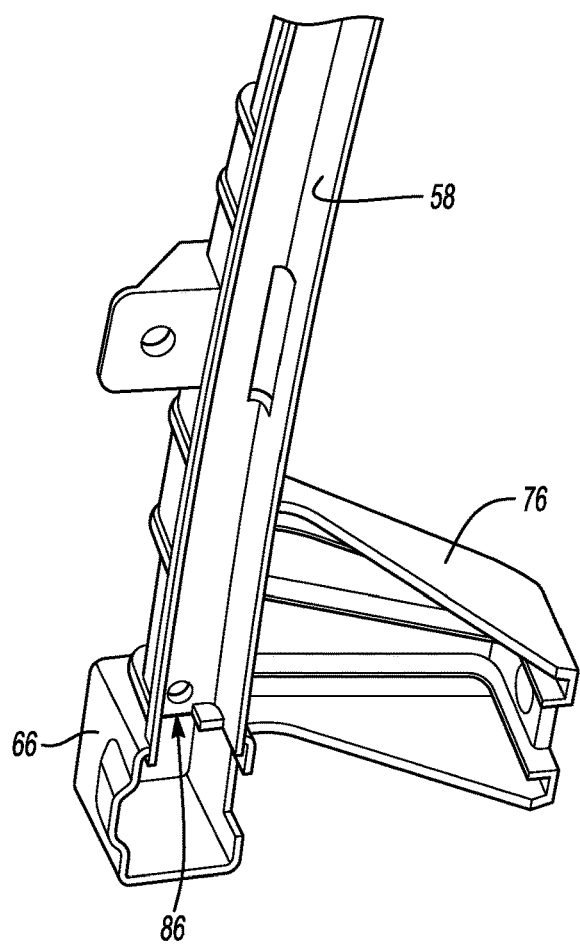
FIG. 5 shows a perspective view of a funnel of the liquid diverter assembly after forming the funnel together with the aft glass run.
Figure 6:
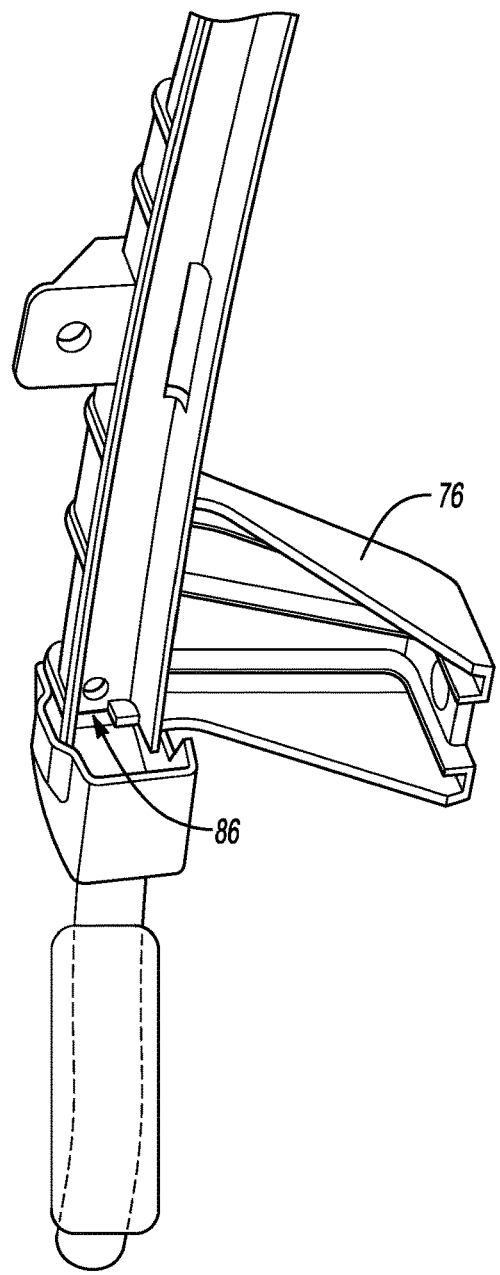
FIG. 6 shows the funnel of FIG. 5 after being rotated to an assembled position with the aft glass run.

To, among other things, simplify forming, the funnel 66 and the aft glass run 58 can be formed together such that the funnel 66 is attached to the aft glass run 58 via a living hinge 86 as shown in FIG. 5. The funnel 66 can then be rotated relative to the aft glass run 58 about the living hinge 86 to the assembled position shown in FIG. 6. The funnel 66 can be snap-fit to the aft glass run 58 to hold the funnel 66 in the assembled position.

In another example, the funnel 66 can be formed separately from the aft glass run 58, and then directly attached to the aft glass run 58 with at least one mechanical fastener, such as a rivet, for example.

The conduit 70 can be sleeved over a boss of the funnel 66 to secure the conduit 70 to the funnel 66. The conduit 70 is a hose in this example. In another example, the conduit 70 could be provided by a channel.

The conduit 70 can be a polymer-based material, such as polytetrafluoroethylene (PTFE), which has a relatively low coefficient of friction (from 0.05 to 0.08). Such materials can facilitate the communication of liquid and debris through the conduit 70. A wall thickness of the conduit 70 can be 0.5 millimeters or less to, among other things, reduce the likelihood of potential packaging issues. PTFE can provide such wall thicknesses. The conduit 70, which made of PTFE, can have a Rockwell hardness of about 98 Shore A, which means the conduit 70 can be relatively soft and have a reduced likelihood of rattles or squeaks.

The conduit 70 can be wrapped with foam 90 to mitigate potential noise issues. In an example, the foam 90 is coextruded with the conduit 70. Further, in some examples, the lower end of the conduit 70 could be flared radially outward to inhibit removal of the foam 90 from the conduit 70.

Figure 7:
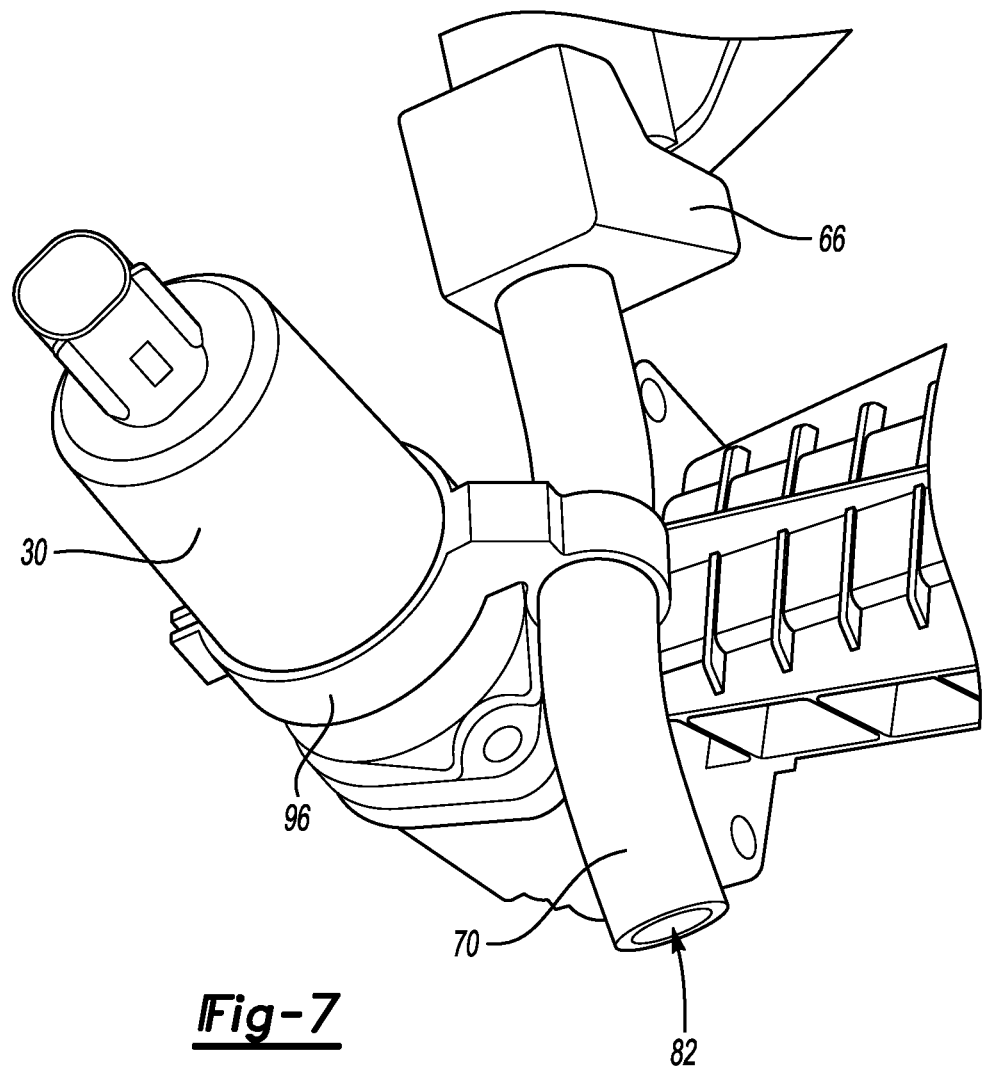
FIG. 7 shows a liquid diverter assembly having a conduit held by a bracket.

In another example, as shown in FIG. 7, the conduit 70 can instead or additionally held by a bracket 96 that secures the conduit 70 relative to the presenter actuator 30.

Features of the disclosed embodiments include collecting liquid above an electrically powered component of a vehicle door and then diverting that liquid around the electrically powered component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A liquid diverter assembly for a vehicle door, comprising:
    a funnel adjacent a vertically lower end portion of a glass run within a vehicle door; and
    a conduit that communicates liquid from the funnel around an electrically powered component of the vehicle door, wherein the conduit is a hose.

2. The liquid diverter assembly of claim 1, wherein the funnel and the glass run are formed together as a single monolithic structure.

3. The liquid diverter assembly of claim 1, further comprising a bracket, the glass run secured to a panel of the vehicle door through the bracket.

4. The liquid diverter assembly of claim 1, wherein the glass run and the funnel are made of a polymer-based material.

5. The liquid diverter assembly of claim 1, wherein the funnel is configured to receive liquid from the glass run.

6. A liquid diverter assembly for a vehicle door, comprising:
    a funnel adjacent a vertically lower end portion of a glass run within a vehicle door; and
    a conduit that communicates liquid from the funnel around an electrically powered component of the vehicle door, wherein the funnel is directly attached to the glass run.

7. The liquid diverter assembly of claim 1, wherein the liquid is water.

8. The liquid diverter assembly of claim 1, further comprising a door presenter as the electrically powered component.

9. The liquid diverter assembly of claim 8, further comprising an electrically powered door latch adjacent the vertically lower end portion of the glass run, the funnel configured to block liquid from splashing on the electrically powered door latch.

10. A method of diverting liquid within a vehicle door, comprising:
    collecting liquid from a glass run of a vehicle door within a funnel;
    communicating liquid from the funnel to a conduit; and
    communicating liquid through the conduit such that the liquid moves around an electric component of the vehicle door, wherein the glass run and the funnel are formed together as a single, continuous structure.

11. The method of claim 10, wherein the collecting within the funnel is at a position vertically above the electric electrically powered component.

12. The method of claim 10, wherein the funnel is adjacent a vertically lower end portion of the glass run.

13. The method of claim 10, further comprising guiding movement of a vehicle window using the glass run.

14. The method of claim 10, wherein the conduit opens to an outlet that is vertically beneath the electric electrically powered component.

15. The method of claim 10, wherein the funnel is directly attached to the glass run.

16. The method of claim 10, wherein the glass run includes a channel that receives a vehicle window when the vehicle window is lowered within the vehicle door.

17. The method of claim 16, wherein the collecting of liquid from the glass run includes a collecting of liquid that has passed through the channel.

18. The method of claim 10, wherein the conduit is a hose.

* * * * *